United States Patent
Dayalan et al.

(10) Patent No.: US 9,850,911 B2
(45) Date of Patent: Dec. 26, 2017

(54) TURBOCHARGER WITH LUBRICANT DEFLECTOR

(71) Applicant: HONEYWELL INTERNATIONAL INC., Morristown, NJ (US)

(72) Inventors: Sunil Dayalan, tamil nadu (IN); Zachariah Poomkuzhimanni John, Karnataka (IN); Kiran Pithamber, Karnataka (IN); Prithivi Karthikeyan, Morristown, NJ (US); Giorgio Figura, Morristown, NJ (US); Maltesh Kolur, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 387 days.

(21) Appl. No.: 14/414,197

(22) PCT Filed: Jul. 14, 2013

(86) PCT No.: PCT/US2013/050418
§ 371 (c)(1),
(2) Date: Jan. 12, 2015

(87) PCT Pub. No.: WO2014/014791
PCT Pub. Date: Jan. 23, 2014

(65) Prior Publication Data
US 2015/0176593 A1 Jun. 25, 2015

Related U.S. Application Data

(60) Provisional application No. 61/671,760, filed on Jul. 15, 2012.

(51) Int. Cl.
*F16C 33/10* (2006.01)
*F04D 29/063* (2006.01)
(Continued)

(52) U.S. Cl.
CPC .......... *F04D 29/063* (2013.01); *F01D 25/16* (2013.01); *F01D 25/186* (2013.01); *F04D 17/10* (2013.01);
(Continued)

(58) Field of Classification Search
CPC ........ F01D 25/18; F01D 25/16; F01D 25/186; F04D 29/063; F04D 17/10; F04D 29/083; F16C 33/1045
See application file for complete search history.

(56) References Cited

U.S. PATENT DOCUMENTS 4,480,440 A * 11/1984 Harper .................... F02B 39/14
417/407
4,523,763 A 6/1985 Asano et al.
(Continued)

FOREIGN PATENT DOCUMENTS

| DE | 112013001938 T5 * | 2/2015 | ............ F16C 17/045 |
| FR | 2746849 A1 | 10/1997 | |
| JP | 10-339155 A | 12/1998 | |

OTHER PUBLICATIONS

DE 112013001938 T5—Translation.*
(Continued)

*Primary Examiner* — Woody Lee, Jr.
*Assistant Examiner* — Sabbir Hasan
(74) *Attorney, Agent, or Firm* — Brian J. Pangrle

(57) ABSTRACT

A turbocharger assembly can include a center housing that includes a compressor side, a turbine side, a bore that extends between the compressor side and the turbine side and a socket at the compressor side; a journal bearing disposed in the bore; and a lubricant deflector disposed at least partially in the socket. Various other examples of devices, assemblies, systems, methods, etc., are also disclosed.

19 Claims, 16 Drawing Sheets

(51) Int. Cl.
*F01D 25/16* (2006.01)
*F04D 17/10* (2006.01)
*F04D 29/08* (2006.01)
*F01D 25/18* (2006.01)
*F16C 17/02* (2006.01)

(52) U.S. Cl.
CPC ........ *F04D 29/083* (2013.01); *F16C 33/1045* (2013.01); *F05D 2220/40* (2013.01); *F05D 2240/58* (2013.01); *F05D 2260/602* (2013.01); *F16C 17/02* (2013.01); *F16C 2360/24* (2013.01)

(56) References Cited

U.S. PATENT DOCUMENTS

| | | |
|---|---|---|
| 4,664,605 A | 5/1987 | Asano et al. |
| 6,017,184 A | 1/2000 | Aguilar et al. |
| 2004/0213663 A1 | 10/2004 | Duerr et al. |
| 2008/0232729 A1 | 9/2008 | Petitjean et al. |
| 2010/0132358 A1* | 6/2010 | Purdey .......... F01D 25/166 60/605.3 |
| 2010/0139270 A1 | 6/2010 | Koch et al. |
| 2011/0007991 A1 | 1/2011 | Miller et al. |

OTHER PUBLICATIONS

EP Application No. 13820123.1-1607 / 2872753—Extended Search Report dated Feb. 11, 2016 (7 pages).
PCT/US2013/050418 PCT ISR—dated Oct. 15, 2013 (3 pages).
PCT/US2013/050418 PCT Written Opinion—dated Oct. 15, 2013 (6 pages).
PCT/US2013/050418 PCT IPRP—dated Jan. 20, 2015 (7 pages).
Garrett, Water-Cooled Turbochargers: They Need Water! (8 pages).
Stopla, Turbulent Heat Transfer, Apr. 30, 2004 (83 pages).
Garret, The Garrett Turbocharger (10 pages).

* cited by examiner

TURBOCHARGER WITH LUBRICANT DEFLECTOR

TECHNICAL FIELD

Subject matter disclosed herein relates generally to turbochargers for internal combustion engines.

BACKGROUND

A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to lubricant leakage from a bearing system to an air compressor, the main driving force is often a pressure differential created between lubricant passages/cavities inside a center housing that houses a bearing system of a turbocharger and an air space behind a compressor wheel (e.g., a space defined by a backplate and a compressor wheel). When the pressure inside the center housing is more than the pressure in the space behind a compressor wheel, the pressure differential can drive lubricant from the center housing to the compressor. Where an intercooler is employed, lost lubricant can foul the intercooler, air passages, combustion chambers, etc., which can impact performance, longevity, etc.

Various technologies and techniques described herein are directed to deflectors, journal bearings, housings, assemblies, etc., which may improve turbocharger performance, longevity, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
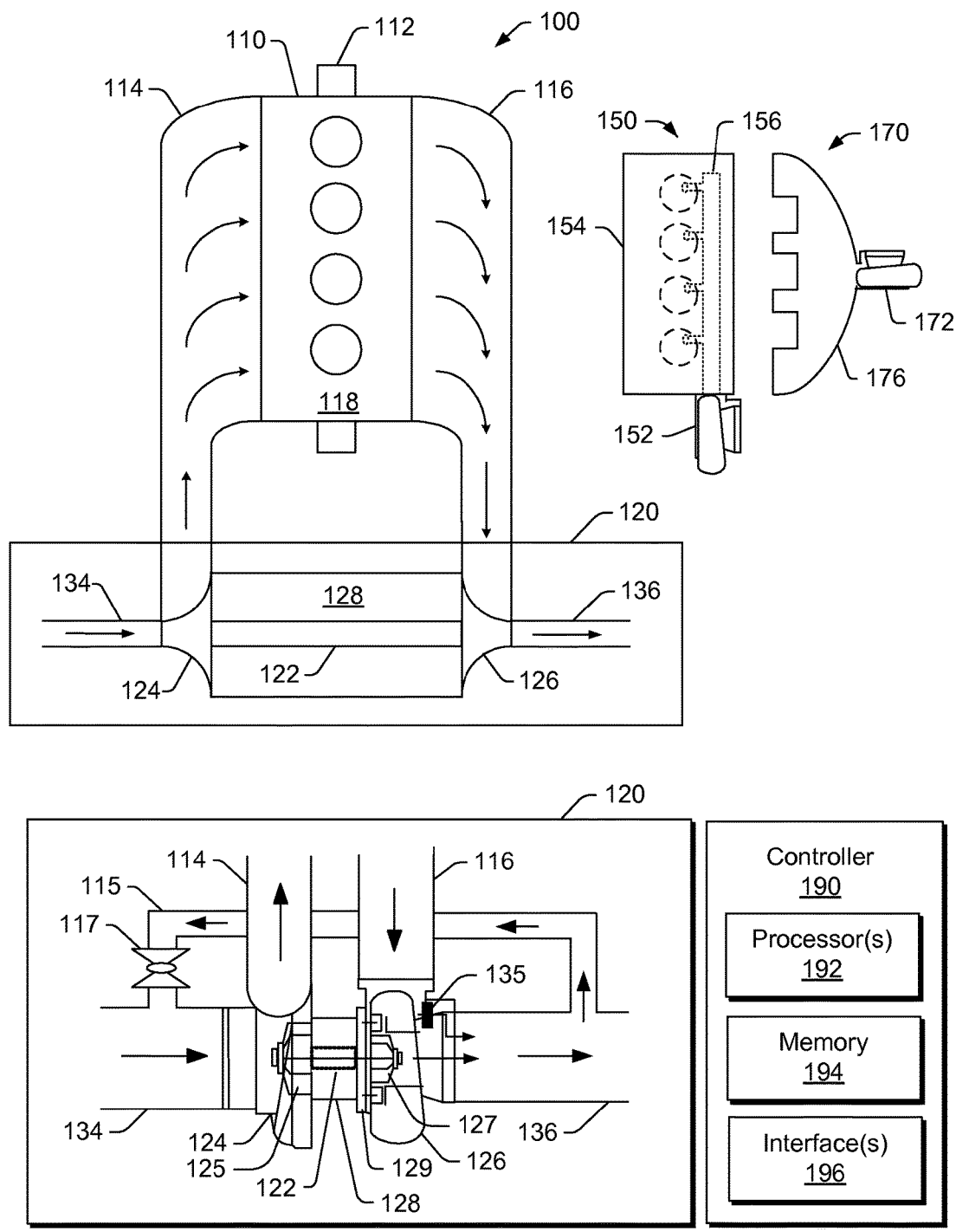
FIG. 1 is a diagram of an example of a turbocharger, an example of an internal combustion engine, an example of a controller and some examples of turbine housings.

Turbochargers are frequently utilized to increase output of an internal combustion engine. Referring to FIG. 1, a system 100 includes an internal combustion engine 110 and a turbocharger 120 where the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system disposed in the housing 128 such that rotation of the turbine wheel 127 causes rotation of the compressor wheel 125.

In the example of FIG. 1, a variable geometry assembly 129 is shown as being, in part, disposed between the housing 128 and the turbine housing 126. Such an assembly may include vanes or other components to vary geometry of a passage (e.g., a nozzle or nozzles) that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine housing 126. The wastegate valve 135 may be controlled to allow exhaust from the exhaust port 116 to bypass the turbine wheel 127. As an example, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the turbine housing 172, for example, optionally without any separate, intermediate length of exhaust piping. In the example arrangements 150 and 170, the turbine housings 152 and 172 may be configured for use with a variable geometry assembly such as the assembly 129 or, for example, one or more other assemblies described herein.

In FIG. 1, an example of a controller 190 is shown as including one or more processors 192, memory 194 and one or more interfaces 196 (e.g., for input and/or output of information, control signals, etc.). As an example, the memory 194 may store instruction executable by at least one of the one or more processors 192. Such a controller may include circuitry such as circuitry of an engine control unit. As an example, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
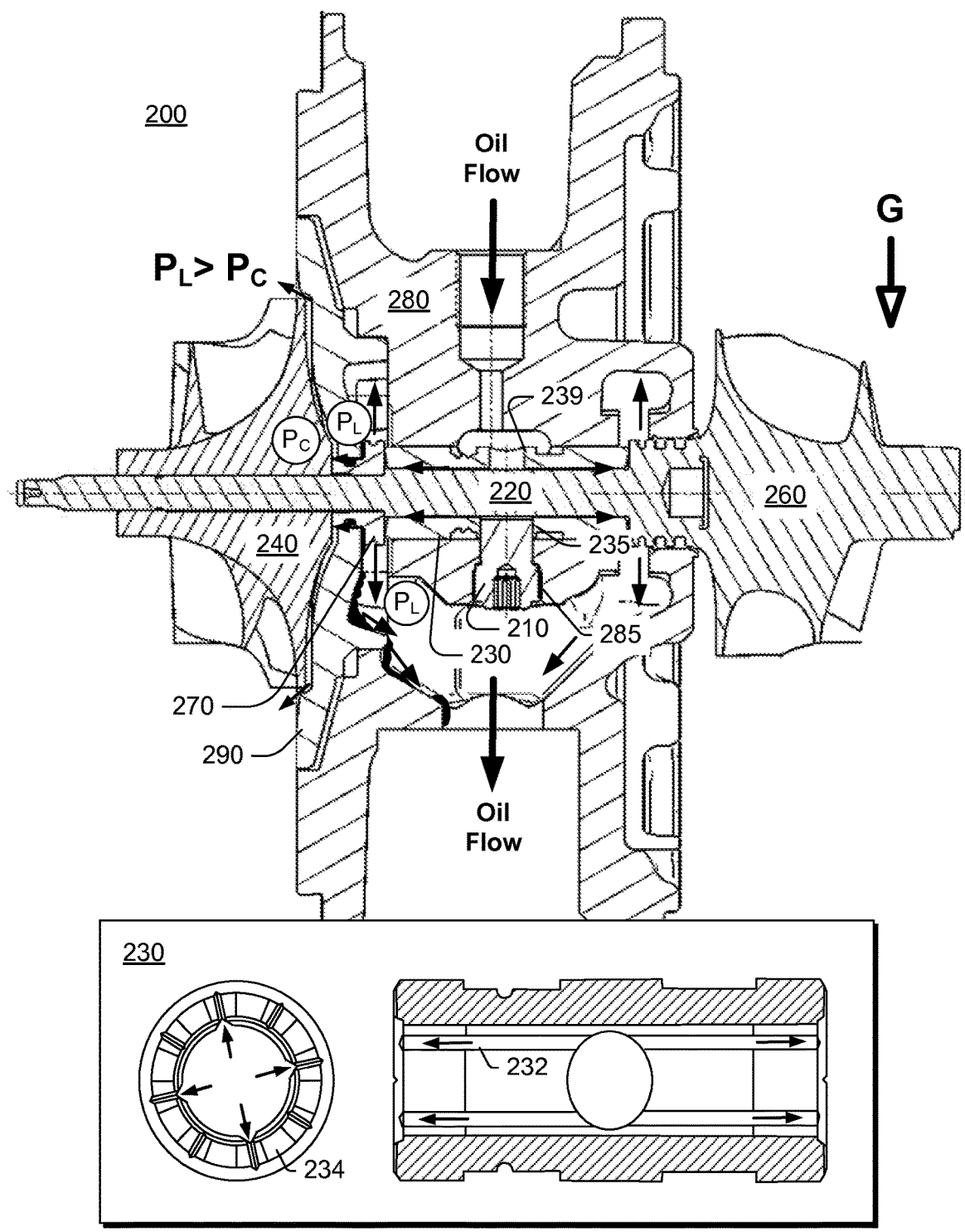
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side. The journal bearing 230 is located at least partially in a through bore of the center housing 280 via a locating pin 210. The locating pin 210 may be secured by being screwed into a socket 285 of the housing 280 and may be received by an aperture 235 of the journal bearing 230 to thereby locate the journal bearing 230 in the through bore of the center housing 280. As an example, the locating pin 210 may axially and azimuthally locate the journal bearing 230 in the through bore of the center housing 280. As shown in the example of FIG. 2, opposite the aperture 235, the journal bearing 230 includes a lubricant opening 239 for flow of lubricant to inner journal surfaces of the journal bearing 230 that support the shaft 220. Lubricant may flow to the through bore of the center housing 280, through the lubricant opening 239 and to the inner journal surfaces to form lubricant films that lubricate the shaft 220 within the journal bearing 230. Lubricant may also flow to clearances between walls of the bore of the center housing 280 and outer surfaces of the journal bearing 230.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

FIG. 2 also shows an end view and a cross-sectional view of the journal bearing 230. In the example of FIG. 2, the journal bearing 230 includes axially oriented channels 232 that extend across inner journal surfaces for flow of lubricant. The channels 232 extend to the end of the journal bearing 230 where various features provide for distribution of lubricant across thrust pads (e.g., thrust surfaces) 234 of the journal bearing 230. The thrust pads 234 of the journal bearing 230 and lubricant may help to manage thrust forces experienced during operation.

In the example of FIG. 2, the thrust surfaces forming the thrust pads 234 include radial grooves to improve thrust capacity while also enhancing contamination control. As an example, eight radial grooves at 45° spacing can be employed with four of the grooves in alignment with the axial grooves in the bearing bore. As an example, each of the axial grooves 232 may have a V-shape (e.g., a 90° V-shape). As shown, a relief on the inner periphery of each thrust surface may act to enhance lubricant delivery and distribution.

The thrust collar 270 can include an integral slinger or a separate slinger component may be provided. A slinger acts to direct lubricant outwardly away from the shaft, as indicated by arrows. A slinger can include one or more passages that extend from an inner radius to an outer radius to direct lubricant outwardly as the slinger rotates.

In the example of FIG. 2, the thrust collar 270 is shown as including an integral slinger and an annular face that faces the end of the journal bearing 230. As an example, lubricant may, under pressure of a lubricant feed system (e.g., an engine lubricant pump), be supplied to the thrust pads 234 of the journal bearing 230 to form a lubricant film between the annular face of the thrust collar 270 and the thrust pads 234 of the journal bearing 230. As the thrust collar 270 can rotate, lubricant that forms the lubricant film may be slung radially outwardly as well (e.g., additionally to lubricant in the passages of the slinger). Whether lubricant is slung from passages of the slinger or from the lubricant film, the lubricant may drain under the influence of gravity (see arrow labeled "G") downwardly towards a lubricant drainage cavity of the center housing 280.

FIG. 2 also shows small arrows near the compressor wheel 240 to indicate where lubricant may escape and possibly be carried with gas compressed by rotation of the compressor wheel 240 (e.g., in a compressor housing). A slinger may help to reduce escape of lubricant via a compressor. As shown in the example of FIG. 2, the backplate 290 has a contour such that slung lubricant can collect and flow along a larger radius located a distance away from the shaft 220. A slope at the bottom side of the contour of the backplate 290 may direct flow of lubricant to the lubricant drainage cavity of the center housing 280 (see, e.g., arrows).

As to pressures, the region formed between the backplate 290 and the center housing 280 can have a pressure that is approximately the same as that of the lubricant drainage cavity of the center housing (see, e.g., $P_L$). Thus, in such a scenario, the flow of lubricant to the lubricant drain of the center housing 280 occurs mainly under the influence of gravity. Such an approach may be considered an expansion approach, which acts to minimize the pressure of the lubricant exiting a clearance between the shaft 220 and the journal bearing 230 and, hence, minimize the driving force (e.g., pressure differential) for escape of lubricant to a space between the backplate 290 and the compressor wheel 240 (see, e.g., $P_C$). As indicated in the example of FIG. 2, by having an enlarged region (e.g., large volume) between the backplate 290 and the center housing 280, a large pressure drop may be achieved for lubricant exiting a clearance between the shaft 220 and the journal bearing 230 (e.g., considering that the lubricant is fed to the center housing 280 via a pump such as an engine oil pump). In the example of FIG. 2, small arrows indicate a flow direction for lubricant escape to the space via an interface formed between the thrust collar 270 and the backplate 290, noting that one or more seal rings (e.g., O-rings) may be positioned about the thrust collar 270 to resist such flow.

As an example of lubricant leakage in an assembly such as the assembly 200, consider a vehicle moving downhill where its engine demands a high mass flow rate while there is no power generated by the engine resulting is low inlet pressure to an exhaust turbine inlet of the turbocharger. This condition can result in a very high level of negative pressure (vacuum) at the intake of the turbocharger. The boost that could be generated at this condition is considerably less due to lower rotational speed of the turbocharger, which results in low inlet pressure to the turbocharger and hence very low pressure behind the compressor wheel and the turbine wheel. During such a downhill scenario, engine lubricant pressure, which may also provide lubricant to lubricate the turbocharger bearing system, tends to be high as the engine is run on a downhill while the pressure in a space between the compressor wheel and the backplate is low. Hence, in such a scenario conditions are ripe for lubricant leakage from passages, cavities, etc. of a center housing/bearing system to a space behind a compressor wheel as well as, for example, to a space behind a turbine wheel.

As an example, in contrast to an expansion approach, a force evacuation method can help to reduce lubricant leakage. Such a force evacuation method can include configuring a bearing system with a deflector to build up pressure (e.g., "capture" pressure) near an exit of a journal bearing (i.e., rather than seeking to increase volume to maximize pressure drop). In such an example, it may be possible to build up the pressure of the lubricant exiting from the journal bearing by restricting the exiting lubricant to a relatively small space (e.g., a cavity formed at least in part by the deflector), where, upon pressurizing the lubricant to feed it to the bearing system, the built up pressure can be used to direct the flow of lubricant from the cavity to a lubricant drain of the center housing via one or more openings (e.g., holes, slots, etc.), for example, provided at an exit (e.g., bottom side) of the deflector. Further, through use of such a deflector, lubricant exiting one or more clearances about a journal bearing surface may be restrained, collected and directed to a lubricant drainage cavity without excessive splashing around after exiting via the one or more openings of the deflector. As an example, pressure build-up in a cavity may be tailored based on one or more parameters of a deflector (e.g., shape, dimensions, number of openings, size of opening(s), etc.). Accordingly, pressure that exists in an annular clearance between a shaft and a journal bearing may experience a considerably lesser drop than with an expansion approach. In a force evacuation, pressure drop may be controlled by cavity shape, size, etc., such that pressure can assist with directing lubricant from the cavity towards a lubricant drain, for example, of a center housing. As an example, a deflector can provide for "shifting" pressure drop (e.g., pressure driving force) to an exit of a deflector defined cavity to thereby drive lubricant towards a lubricant drain (e.g., a lubricant drain of a center housing).

As an example, by collecting and directing lubricant with a deflector, the residence time of the lubricant with respect to the lubricant drainage cavity of a center housing may be reduced. For example, by angling holes to point at a drain of a center housing, flow of lubricant exiting the deflector may drain more quickly from the lubricant drainage cavity of the center housing (e.g., which may reduce risk of coking, extend longevity of the lubricant, etc.). As described with respect to various examples herein, a deflector may be implemented to tailor pressure, flow, residence time, etc., of lubricant within a turbocharger. Data from trials of a turbocharger with an example of a deflector demonstrated absence of compressor side bearing system lubricant leakage for pressure differentials where compressor pressures were of the order of about −20 kPa (i.e., a vacuum).

Figure 3:
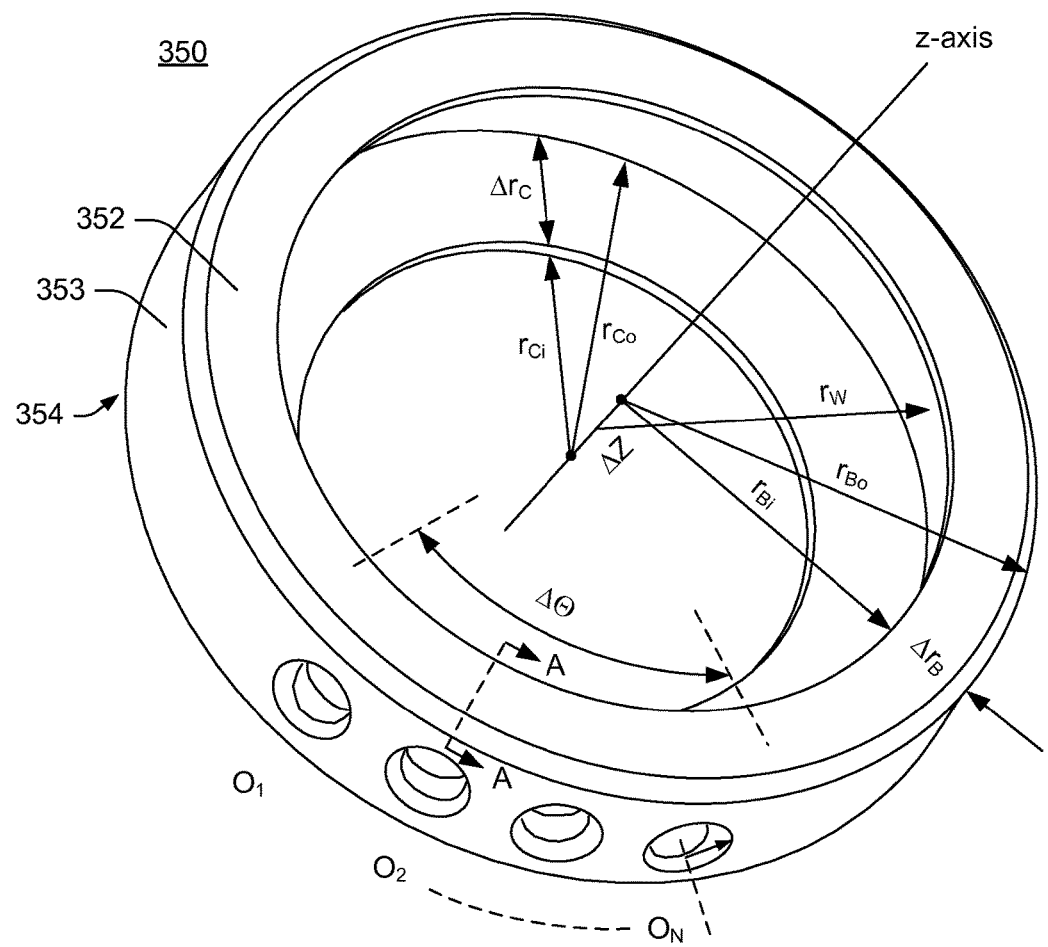
FIG. 3 is a perspective view of an example of a deflector.
Figure 3:
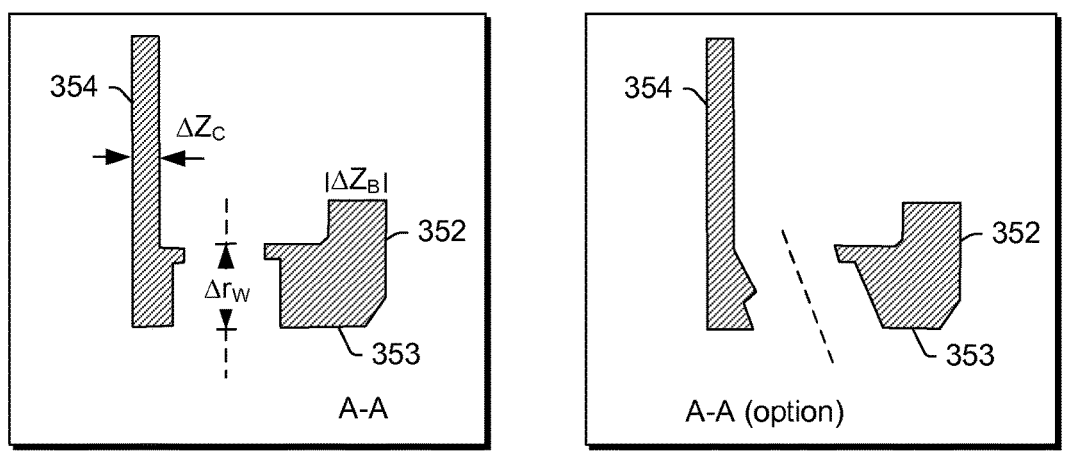

FIG. 3 shows an example of a deflector 350 that can be positioned with respect to a housing to form a cavity about an end of a journal bearing. In the example of FIG. 3, the deflector 350 includes a compressor side inner radius ($r_{Ci}$), a compressor side outer radius ($r_{Co}$), a wall radius ($r_W$), a bearing side inner radius ($r_{Bi}$) and a bearing side outer radius ($r_{Bo}$). As shown, a bearing side annular face 352 (e.g., surface) exists between the bearing side inner and outer radii ($\Delta r_B$), a compressor side annular face 354 (e.g., surface) exists between the compressor side inner and outer radii ($\Delta r_C$) and a cylindrical or ring wall face 353 (e.g., surface) exists between the faces 352 and 354. Over an azimuthal span ($\Delta\Theta$), openings are shown ($O_1, O_2, \ldots O_N$) in the face 353, which may be configured to provide for flow of lubricant radially outwardly, optionally at an angle (e.g., directed to a lubricant exit of a lubricant drainage cavity of a center housing). In FIG. 3, cross-sectional views, along a line A-A, show some examples of openings.

As an example, the deflector 350 may have various thicknesses. For example, the annular face at the compressor side 354 may be formed by a compressor side annular wall having an axial thickness ($\Delta Z_C$) and the annular face at the bearing side 352 may be formed by a bearing side annular wall having an axial thickness ($\Delta Z_B$), which may be, for example, thicker than the compressor side annular wall. As to the ring wall (e.g., with the openings) that joins the compressor side annular wall and the bearing side annular wall, it may have a thickness ($\Delta r_W$) that is optionally thicker than either of the compressor side and the bearing side annular walls. Thickness or thicknesses of walls of the deflector 350 may optionally be selected according to purpose. For example, the ring wall may be of a thickness to support an interference fit of the deflector 350 in a socket or sockets. As to the compressor side annular wall, it may have a thickness selected based on dimension of a thrust collar or a slinger. The compressor side annular wall may function on a bearing side to form a cavity wall that hinders passage of lubricant from the cavity to a space on a compressor side (e.g., a space defined in part by a compressor backplate and the deflector). As an example, a deflector such as the deflector 350 may be configured for floating on one or more lubricant films. For example, a housing may include a socket, recess, etc. defined at least in part by a surface that forms a clearance with a surface of a deflector such that lubricant may flow to the clearance and form a lubricant film upon which the deflector may float (e.g., in a fully floating or semi-floating manner).

In the example of FIG. 3, the deflector 350 includes a substantially U-shaped cross-section formed by three walls: a ring wall and two side walls (e.g., optionally of different wall heights, thicknesses, etc.). While the openings are shown in the ring wall, alternatively or additionally, one or more openings may exist in one or both of the side walls (e.g., one or both of the side walls may include one or more openings). As an example, a deflector may include a ring wall and one side wall (e.g., consider a substantially L-shaped cross-section). As an example, a deflector may include a curved wall. In such an example, a curved wall may extend from an outer radius to an inner radius over an axial length. In such an example, a side wall or side walls may extend radially inwardly from the curved wall. As an example, a deflector may include two curved walls. For example, a deflector may have a substantially C-shaped cross-section. As an example, a deflector may be a bezel. Shape, size, etc. of a deflector may be based on shape, size, etc. of a center housing having a socket for receipt of at least part of the deflector therein. As an example, a deflector may be a single unitary piece or a collection of two or more pieces, which may cooperate (e.g., interlock, etc.) to define a cavity, one or more openings, etc.

Figure 4:
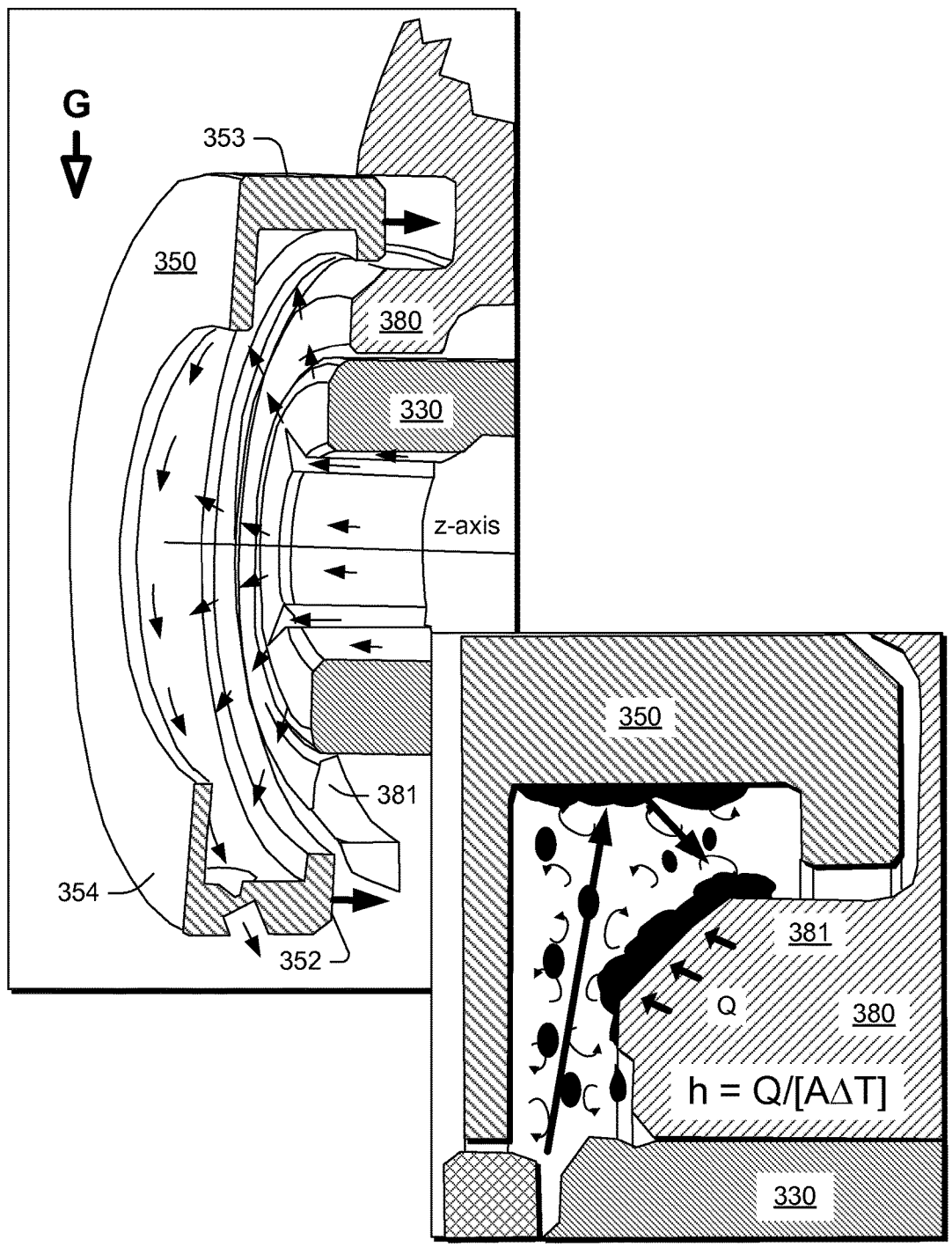
FIG. 4 is a series of cross-sectional views of an example of a turbocharger assembly.

FIG. 4 shows an exploded view of an example of an assembly that includes the deflector 350 as well as a journal bearing 330 positioned in a bore of a housing 380. In the example of FIG. 4, the housing 380 includes a bearing boss 381, which is an annular portion of the housing 380 that extends axially outwardly. The boss 381 may be a full 360 degrees, less than 360 degrees, a single segment boss (e.g., contiguous) or a boss formed of multiple segments.

In the example of FIG. 4, the boss 381 defines part of a socket for receipt of an end of the deflector 350. Specifically, as shown, the boss 381 has a boss surface or surfaces that in part define the socket. As an example, the deflector 350 may be received by the socket via a press-fit. For example, the inner radius at the bearing side of the deflector 350 may be slightly smaller than a radius of a boss surface to allow for an interference fit (e.g., where some amount of expansion or deformation of the deflector 350 occurs upon making the interference fit). Alternatively, or additionally, the outer radius at the bearing side of the deflector 350 may be slightly larger than a radius of the socket to allow for an interference fit. In a close-up cross-section view of FIG. 4, an interference fit is provided at an outer radius of the deflector (e.g., a clearance exists between the inner radius at the bearing side of the deflector 350 and an outer radius of the boss 381). As mentioned, as an example, a deflector may float (e.g., in a fully floating or a semi-floating manner) with respect to a socket of a housing. As an example, a fully floating deflector may float on a lubricant film or films while being able to move radially, axially and azimuthally. As an example, a semi-floating deflector may float on a lubricant film or films while being limited by one or more features as to movement in one or more directions, for example, consider a key and keyway pair of a deflector and a housing that limit rotation of the deflector with respect to the housing (e.g., to maintain orientation of a lubricant opening or openings of the deflector with respect to a lubricant pathway of the housing).

As indicated by small arrows, lubricant can flow along various surfaces of the journal bearing 330 (e.g., inner journal surface, channels, etc.) and radially outwardly within a cavity defined at least in part by the deflector 350 when set in the socket of the housing 380. The close-up cross-sectional view of FIG. 4 shows the deflector 350 set in the socket of the housing 380 where lubricant may flow radially outwardly to a wall of the deflector 350 (e.g., a wall disposed at the wall radius). Lubricant may then flow to one or more surfaces of the boss 381 of the housing 380. As indicated, heat energy may be transferred from the boss 381 to the lubricant. Thus, such an arrangement can aid in cooling of the boss 381.

As an example, flow in the cavity may be turbulent, which can increase one or more heat transfer coefficients (e.g., by decreasing thickness of one or more fluid boundary layers, mixing, etc.). To impact velocity of flow in the cavity, number of openings, size of openings, shape of the deflector, etc., may be selected accordingly. For example, a single small opening may cause more backpressure/resistance than multiple openings or a single large opening. As to backpressure, as mentioned, lubricant may be provided to a bore of a center housing under pressure. Further, as mentioned, a thrust collar, a slinger, etc., positioned adjacent to an end of a journal bearing can rotate to sling lubricant. Thus, flow in a cavity may be tailored based on factors such as size, shape, etc. of a thrust collar, a slinger, etc.; size, shape, etc. of an end of a journal bearing; size, shape, etc. of a deflector; size, shape, etc. of a bearing boss; size, rotational speed, etc. of a shaft; lubricant pressure; lubricant properties; operational temperature; etc.

Figure 5:
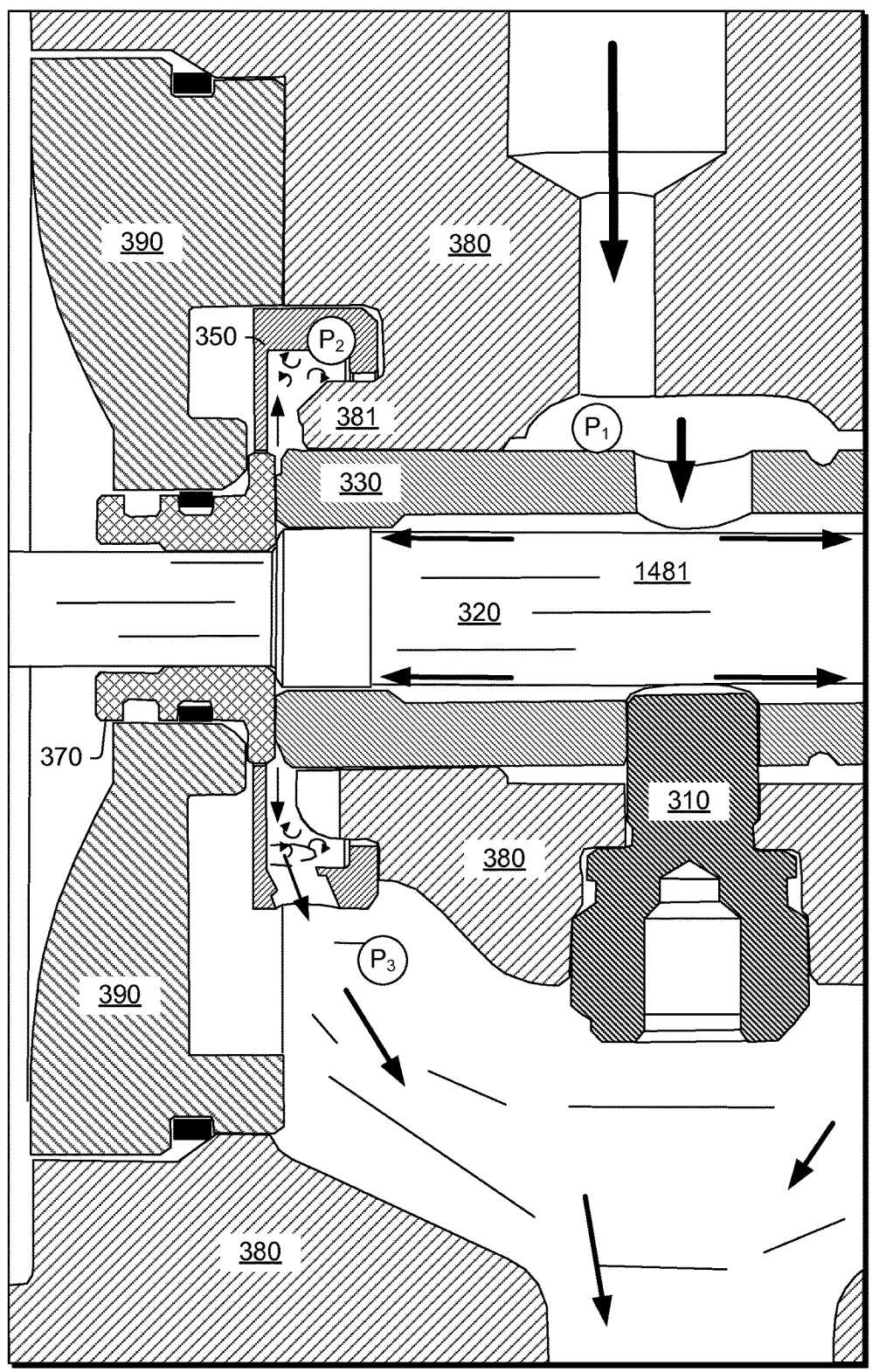
FIG. 5 is a cross-sectional view of an example of a turbocharger assembly.

FIG. 5 shows a cross-sectional view of an example of an assembly that includes the deflector 350 received by a socket of the housing 380. In the example of FIG. 5, a cavity is formed by surfaces of the deflector 350, the journal bearing 330, and the thrust collar 370. As shown, the cavity extends axially over a surface of the boss 381. In such a manner, lubricant may flow to the surface of the boss 381, for example, to absorb heat energy and cool the boss 381.

In the example of FIG. 5, a backplate 390 includes a surface at an inner radius of a bearing side that may abut an outer surface of the deflector 350. At a compressor side, the backplate 390 has a contour configured, for example, with respect to a compressor wheel (e.g., a backside of a compressor wheel). As shown in FIG. 5, the backplate 390 includes a bore where one or more seal rings (e.g., O-rings) may be positioned in one or more annular grooves of the thrust collar 370. In such an example, the one or more seal rings can help reduce escape of lubricant; noting that in comparison to the example assembly 200 of FIG. 2, implementation of the deflector 350 can help reduce amount of lubricant that may reach the one or more seal rings.

In the example of FIG. 5, a radial extension of the thrust collar 370 has an outer radius that is less than the inner radius at the compressor side of the deflector 350. Accordingly, in such an example, a clearance exists between the thrust collar 370 and the deflector 350. As an example, if the thrust collar 370 should be displaced and contact the deflector 350, the deflector 350 may be made of a material that may be deformed by the contact such that the deflector 350 does not interfere with rotation of the thrust collar 370.

FIG. 5 also shows various pressures $P_1$, $P_2$ and $P_3$. In the example of FIG. 5, the deflector 350 acts, in part, to form a cavity that achieves a pressure $P_2$ that is greater than that of an expansion approach. Specifically, the deflector 350 helps to achieve a greater pressure difference between $P_2$ and $P_3$ (e.g., to allow for a force evacuation via one or more bottom openings in the deflector 350); whereas, an expansion approach aims to reduce $P_2$ to $P_3$ (i.e., maximum pressure drop to reduce risk of driving lubricant to the other side of the backplate 390). Thus, for the example of FIG. 5, $P_2$ is closer to $P_1$ when compared to an expansion approach, again, which aims to have $P_2$ much less than $P_1$ and closer to $P_3$. Further, in the example of FIG. 5, lubricant in the cavity formed in part by the deflector 350 can assist with cooling of the bearing boss 381 (e.g., to carry away heat energy generated by friction, heat energy conducted from exhaust at the turbine side, etc.).

Figure 6:
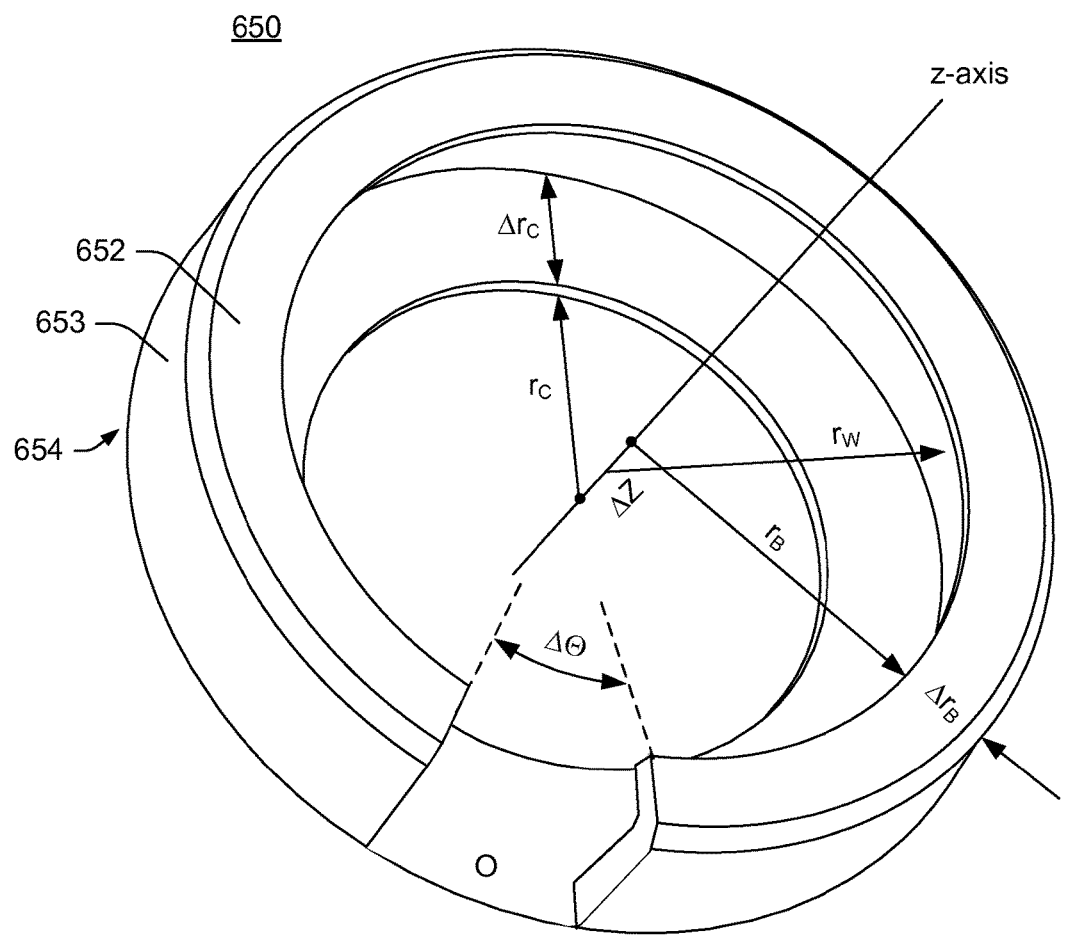
FIG. 6 is a perspective view of an example of a deflector.

FIG. 6 shows an example of a deflector 650 that includes a single opening configured as a gap in the ring wall. As shown in the example of FIG. 6, a bearing side annular face 652 (e.g., surface) exists between bearing side inner and outer radii ($\Delta r_B$), a compressor side annular face 654 (e.g., surface) exists between compressor side inner and outer radii ($\Delta r_C$) and a cylindrical or ring wall face 653 (e.g., surface) exists between the faces 652 and 654. As an example, the span of the gap of the deflector 650 may be selected to provide for a certain amount of backpressure within a cavity defined at least in part by the deflector 650 (e.g., as part of a turbocharger assembly).

Figure 7:
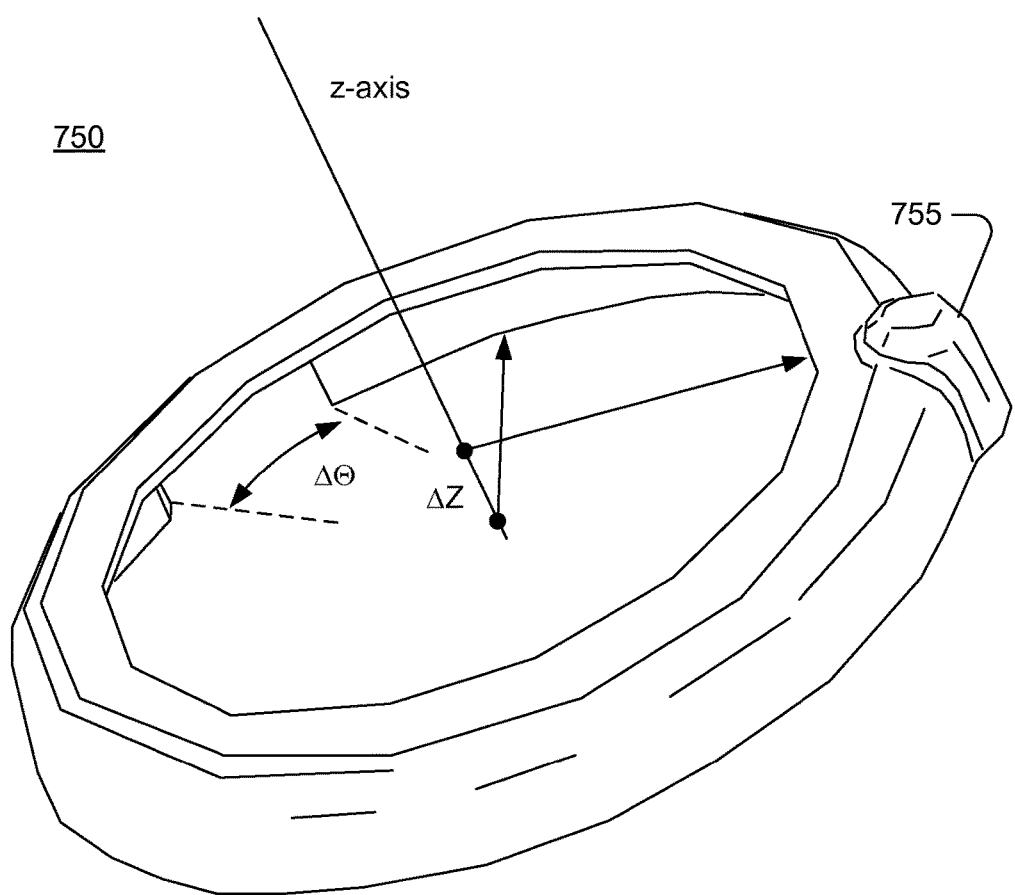
FIG. 7 is a perspective view of an example of a deflector.

FIG. 7 shows an example of a deflector 750 that includes a single opening configured as a gap in a curved ring wall (e.g., a cross-section with a smooth or segmented overall curve). As an example, the curved ring wall may curve over a span of about 90 degrees between an axially facing edge (e.g., a bearing side edge) and a radially facing edge (e.g., a compressor side edge).

As shown in the example of FIG. 7, the deflector 750 may include a key 755. The key 755 may facilitate locating the deflector 750 with respect to a socket, for example, to ensure that the opening is properly located with respect to a lubricant drainage cavity of a center housing (e.g., the socket may include a keyway configured for receipt of the key 755). Further, the key 755 may be an anti-rotation feature to prevent rotation of the deflector 750 in an assembled turbocharger. Yet further, the key 755 may have an axial dimension that acts as an axial stopper (e.g., extending a distance axially outward from a compressor side surface of the deflector 750). For example, the key 755 may act to axially locate a backplate with respect to a center housing. The form of the key 755 (e.g., substantially cylindrical) may provide it with additional strength for purposes of contacting/locating a backplate, which may be attached to a center housing with a certain amount of force (e.g., torque via bolts, studs, etc.). Application of force to the key 755 (e.g., by bolting on a backplate) may assist with sealing the deflector 750 in a socket of a center housing (e.g., about a boss), for example, to reduce lubricant leakage about a contact region between the deflector 755 and the center housing.

As an example, the deflector 750 may be formed from sheet metal. For example, a piece of sheet metal may be provided and then stamped to form the deflector 750 with the opening and the key 755. As shown, the deflector 750 includes a substantially curved cross-section that extends over an axial distance from an inner radius at a compressor side to an outer radius at a bearing side. The shape and size of the deflector 750 may be selected to cooperate with a socket of a center housing. For example, the shape and size may allow for an interference fit in such a socket where lubricant may collect and be directed to a lubricant drainage cavity of the center housing. In such an example, the shape and the size of the deflector 750 may act to increase backpressure on lubricant exiting clearances defined by a journal bearing and a shaft, a journal bearing and a bore, etc. As an example, the inner radius at the compressor side of the deflector 750 may be selected based in part on an outer radius of a thrust collar, a slinger, etc. As an example, the deflector 750 may be a semi-floating deflector, for example, where rotation is limited at least in part by the key 755 while some amount of movement may occur axially and/or radially (e.g., via a clearance or clearances between the deflector 750 and a housing that includes the socket).

Figure 8:
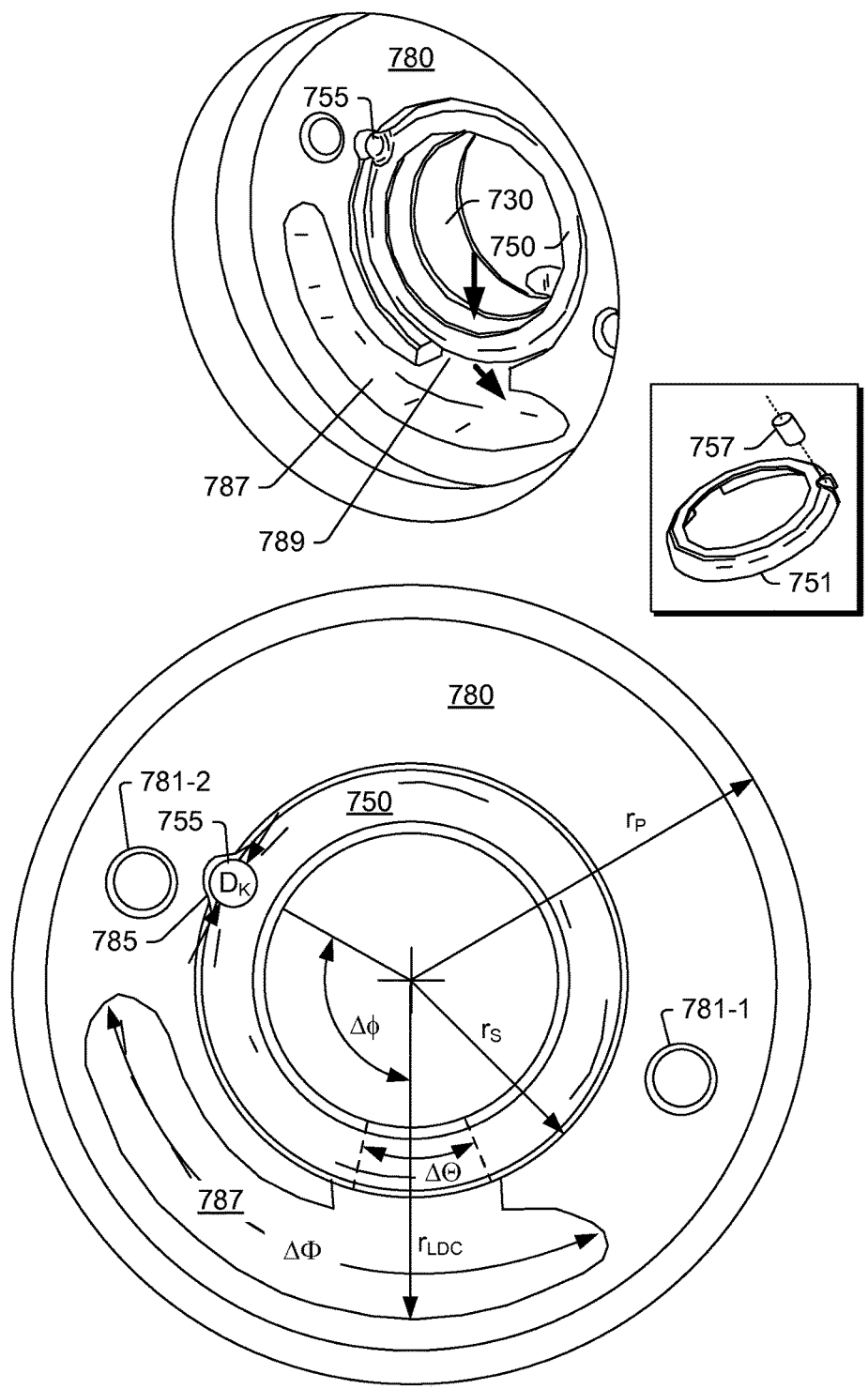
FIG. 8 is a series of views of an example of an assembly.

FIG. 8 shows an example of a center housing 780 with a journal bearing 730 disposed in a bore where the center housing 780 includes one or more mounting features 781-1 and 781-2 (e.g., for bolts, studs, etc.) and a keyway 785 for receipt of the key 755 of the deflector 750 of FIG. 7. As an example, a lubricant deflector may include an integral key or a keyway for receipt of a key. For example, as shown in FIG. 8, a lubricant deflector 751 may include a keyway for receipt of a key 757, for example, where the key 757 may be received by a keyway of a housing. While the key 757 in the example of FIG. 8 is shown as being oriented axially, a key and one or more associated keyways may be oriented radially (e.g., consider rotation of the key 757 by about 90 degrees such that its axis may be in a plane defined by a lubricant deflector with a radially oriented keyway). As an example, a key such as the key 757 may include a compressor side stop surface, for example, that may abut against a surface of a component of an assembly (e.g., a plate, another deflector, etc.). In such an example, the stop surface may act to limit axially movement of the component of the assembly (e.g., at least in a direction toward a center housing).

In the example of FIG. 8, the center housing 780 includes a lubricant drainage cavity extension 787 that spans an angle $\Delta\Phi$ which leads to a main lubricant drainage cavity of the center housing 780, which includes a lubricant exit. Further, in the example of FIG. 8, the center housing 780 includes a gap 789 in the boss 781 (not shown). The gap 789 allows the opening of the deflector 750 to direct lubricant more directly to the lubricant exit of the center housing 780 (see, e.g., lubricant exit of housing 280 of FIG. 2).

As an example, a center housing may include a cavity extension having a smaller volume, span, etc., than the cavity extension 787 of the center housing 780 of FIG. 8. For example, a center housing may have a cavity extension of a span similar to that of the gap 789 in the boss 781. In the example of FIG. 8, the center housing 780 includes a backplate radius $r_P$, which may match a dimension of a backplate, as well as a lubricant drainage cavity radius $r_{LDC}$. At the compressor side of the lubricant drainage cavity, the radius may be selected as appropriate to cooperate with a deflector.

Figure 9:
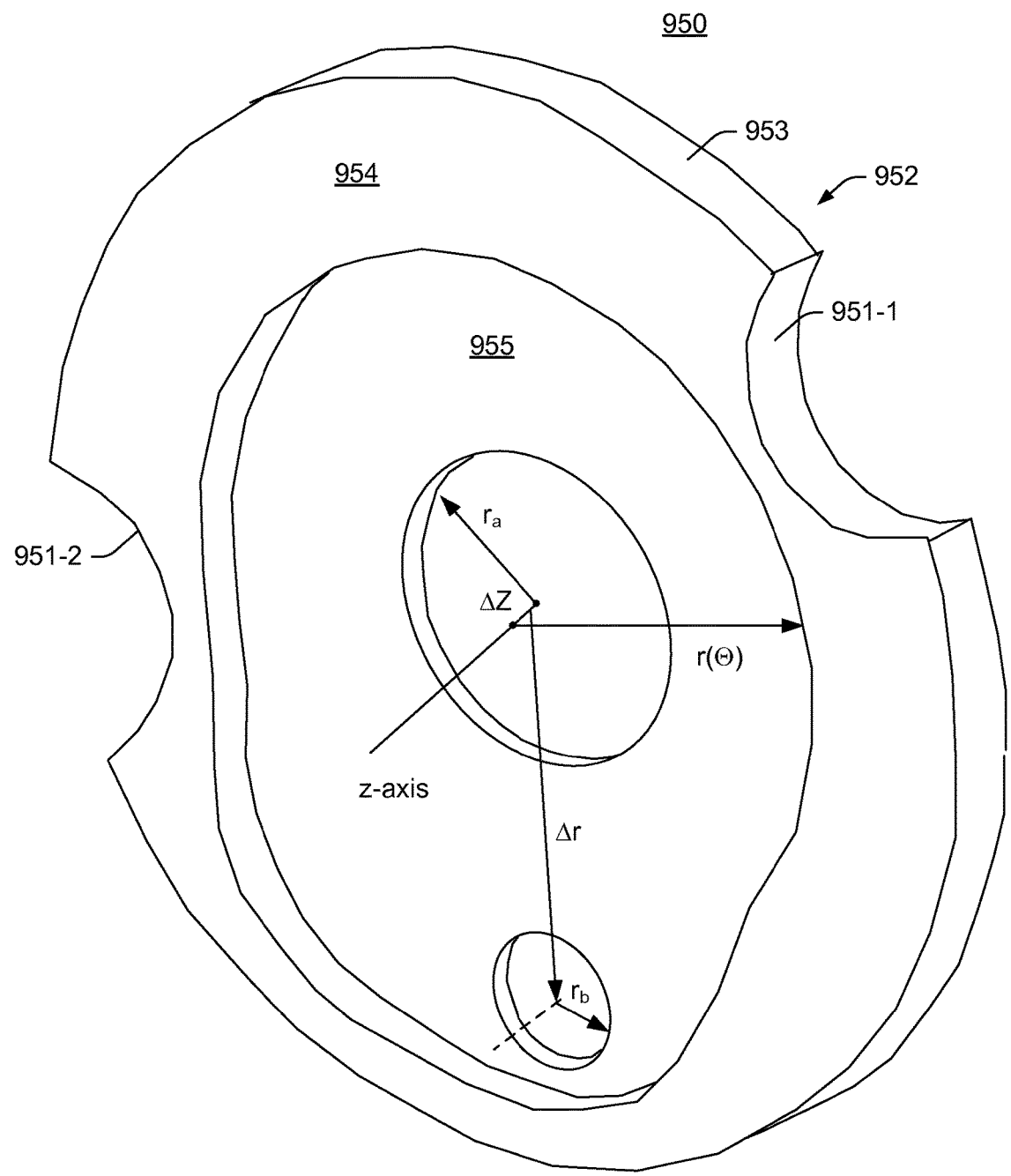
FIG. 9 is a perspective view of an example of a deflector.

FIG. 9 shows an example of a deflector 950. As shown, the deflector 950 includes one or more mounting features 951-1 and 951-2 (e.g., cut-outs for bolts, studs, etc.), an opening about a z-axis (e.g., with a radius $r_a$) and an opening displaced radially ($\Delta r$) from the z-axis (e.g., with a radius $r_b$). The deflector 950 includes a recessed portion 955 inset from a compressor side surface 954 by an axial distance (e.g., $\Delta z$). In operation, the recessed portion 955 may form a cavity with a backplate where lubricant may drain from the cavity via the opening displaced from the z-axis. As shown, the shape of the recess portion 955 may be defined in part by a radial dimension (e.g., r($\Theta$)) which may vary about the z-axis. The deflector 950 also includes a bearing side surface 952 as well as a surface 953 (e.g., with the cut-outs 951-1 and 951-2) disposed between the surfaces 952 and 954.

Figure 10:
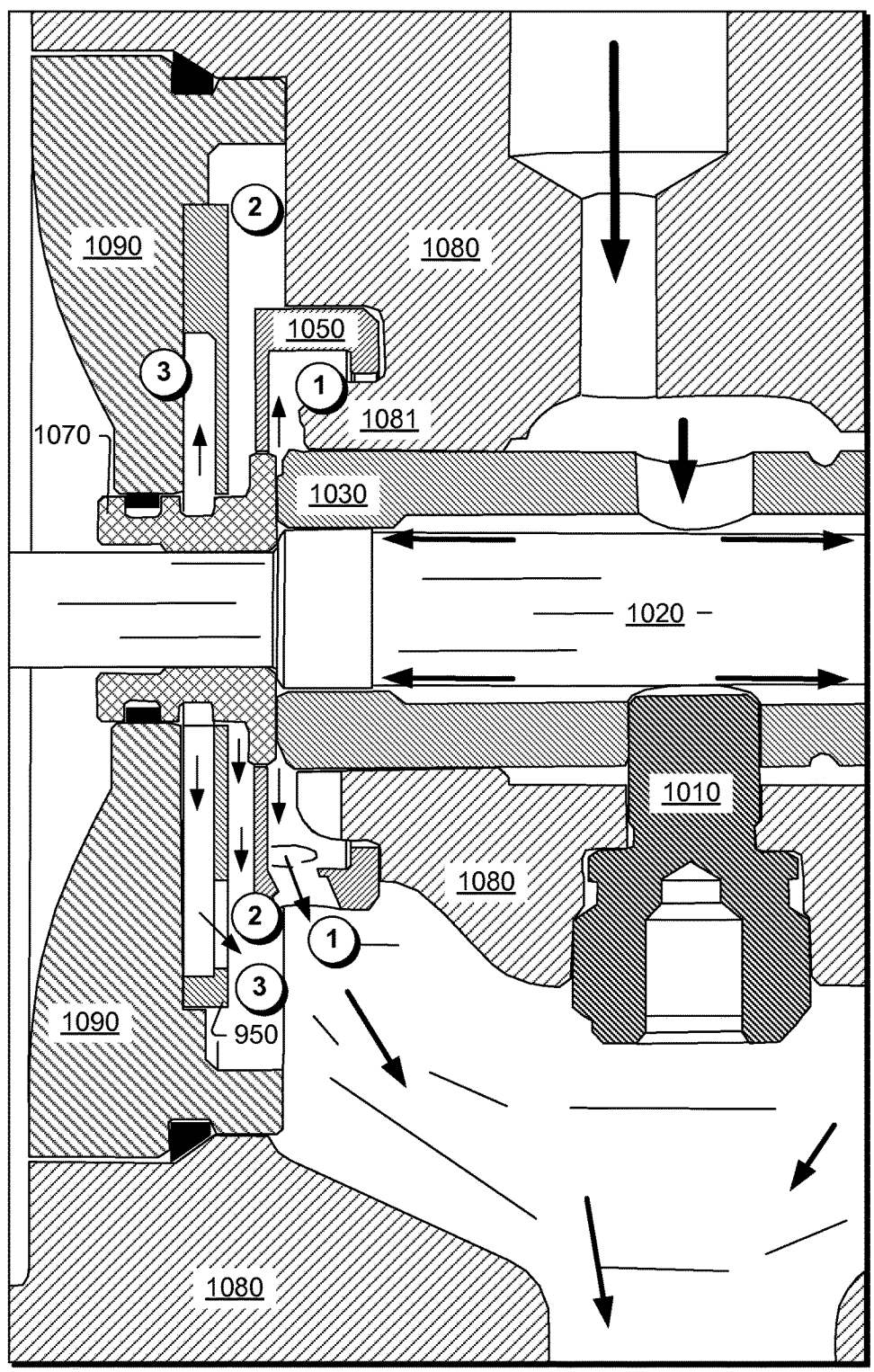
FIG. 10 is a cross-sectional view of an example of a turbocharger assembly that includes two deflectors.

FIG. 10 shows a cross-sectional view of an example of an assembly that includes the deflector 950 as well as a deflector 1050. The two deflectors 950 and 1050 define, in part, three cavities (labeled 1, 2, and 3). In the example of FIG. 10, each of the three cavities can drain to a lubricant drainage cavity of a center housing 1080. Such an arrangement of features may provide for control of heat transfer, reduction in undesirable lubricant leakage, etc. As shown in the example of FIG. 10, each of the three cavities includes an axial dimension as well as a radial dimension that may, for example, define, at least in part, an annular disc shaped space for each of the three cavities.

In the example of FIG. 10, the center housing 1080 includes a boss 1081 and a through bore in which a journal bearing 1030 is positioned to support a shaft 1020 where the journal bearing 1030 may be located via a locating pin 1010. As shown, a thrust collar 1070 may include various diameters, for example, a first diameter that defines a portion of the cavity labeled "1", a second diameter that defines a portion of the cavity labeled "2" and a third diameter (e.g., with bounding shoulders) to receive an O-ring to help form a seal with a bore of a backplate 1090.

As an example, the one or more mounting features 951-1 and 951-2 of the deflector 950 may provide clearance for one or more bolts, studs, etc., for example, that mount the backplane 1090 to the housing 1080. As an example, the deflector 950 may be fit to the backplate 1090 via an interference fit (e.g., about an outer diameter of the deflector 950 and an inner diameter of the backplate 1090). As an example, the deflector 950 may be a floating or semi-floating deflector. For example, in a semi-floating configuration, the one or more mounting features 951-1 and 951-2 may act in conjunction with bolts or studs to limit rotation of the deflector 950 while allowing for some radial or other movement of the deflector 950.

Figure 11:
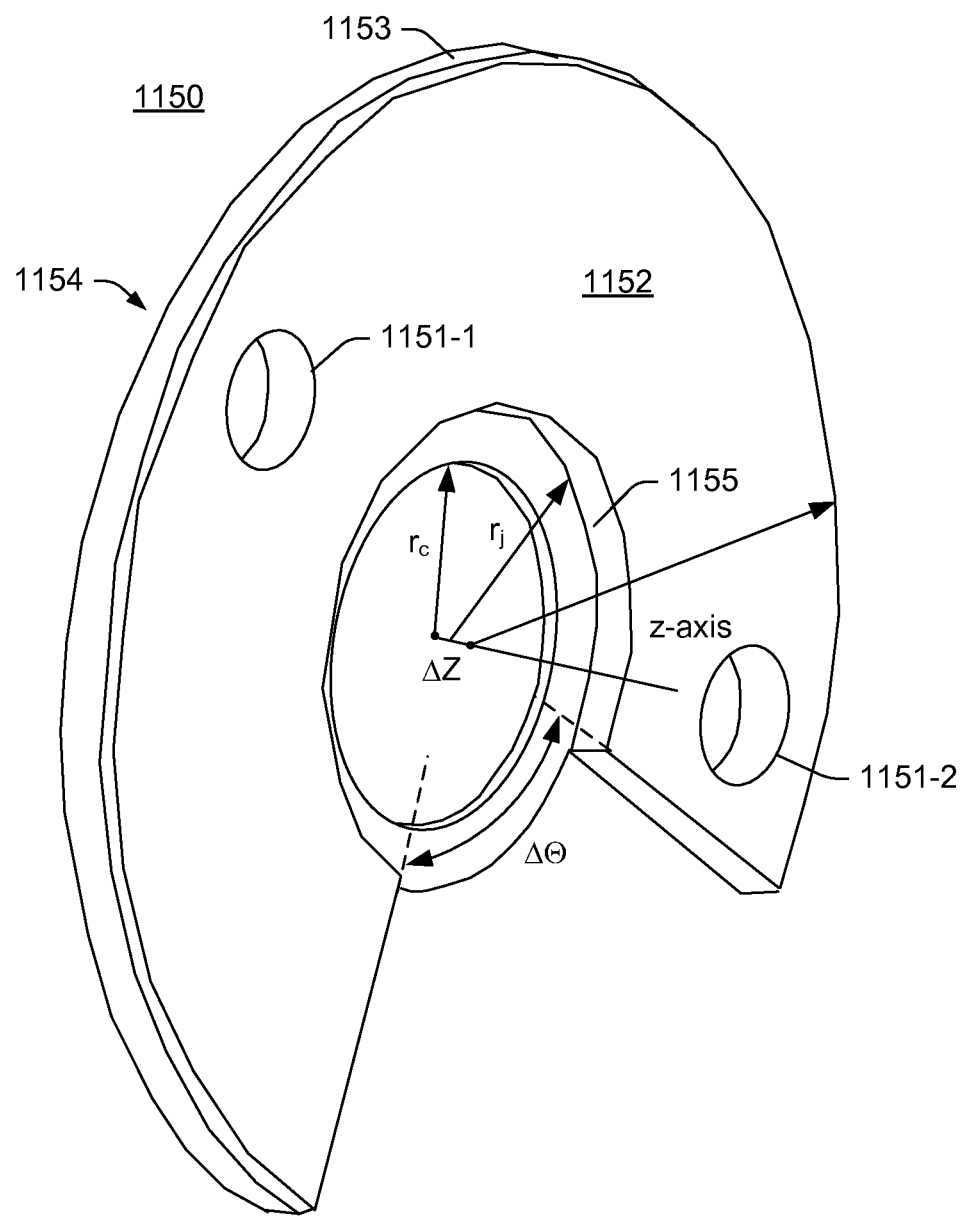
FIG. 11 is a perspective view of an example of a deflector plate.

FIG. 11 shows a perspective view of an example a deflector plate 1150 that includes one or more mounting features 1151-1 and 1151-2 (e.g., openings for bolts, studs, etc.), a journal bearing side surface 1152 that includes a recessed portion 1155, an opposing compressor side surface 1154 and a surface 1153 (e.g., cylindrical or other shape) disposed between the surfaces 1152 and 1154. As shown, the recessed portion 1155 (e.g., or recess) can define, at least in part, a cavity. The recessed portion 1155 includes an inner radius at a compressor side (e.g., $r_c$) and an outer radius at the journal bearing side surface 1152 (e.g., $r_j$). As shown in the example of FIG. 11, the recessed portion 1155 includes an opening defined along a lower portion by a span $\Delta\Theta$. As an example, the span may be selected to match a dimension of a lubricant drainage feature (e.g., cavity) of a center housing.

Figure 12:
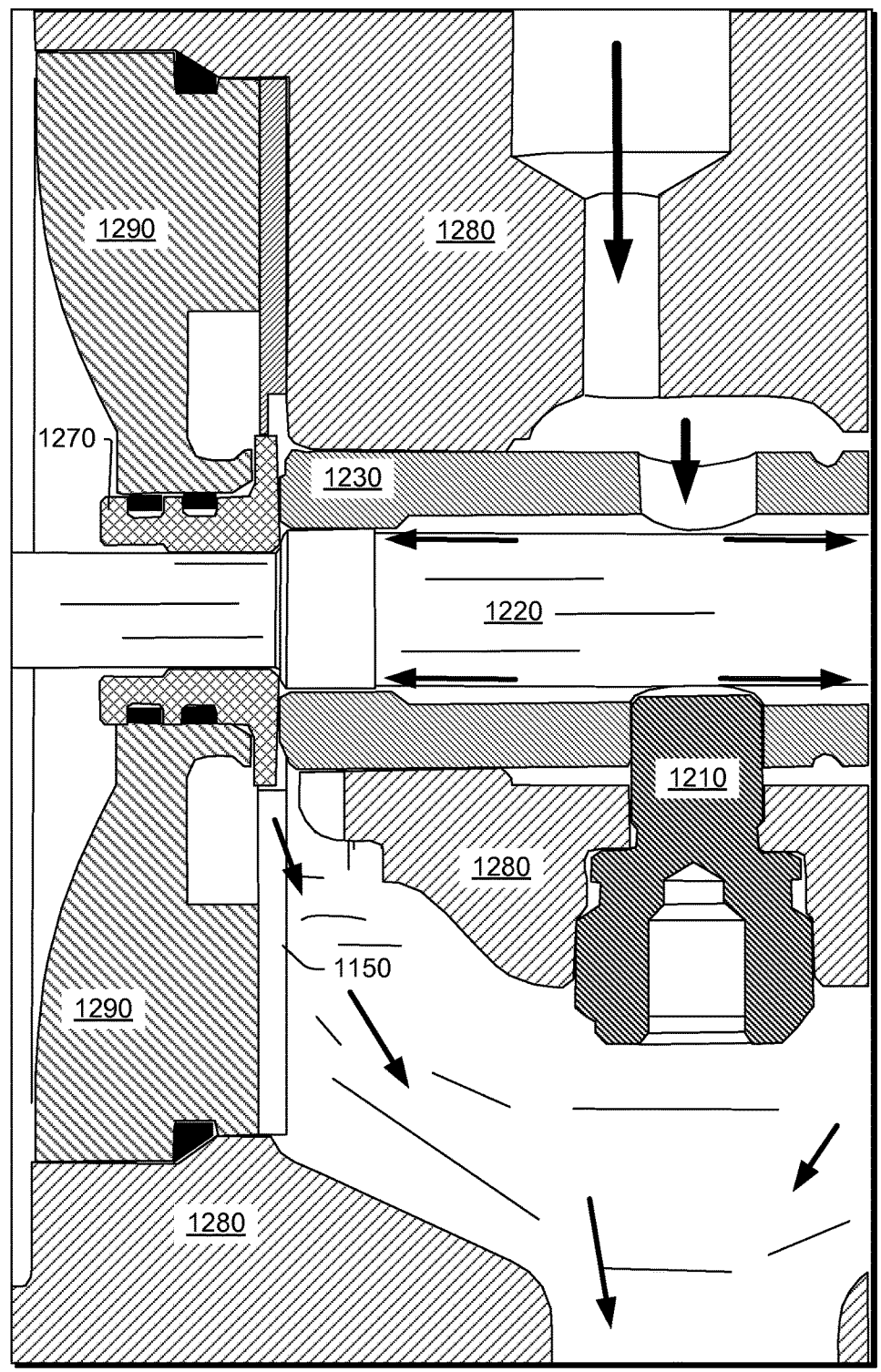
FIG. 12 is a cross-sectional view of an example of a turbocharger assembly that includes a deflector plate.

FIG. 12 shows a cross-sectional view of an example of an assembly that includes the deflector plate 1150 disposed between a backplate 1290 and a center housing 1280. The recessed portion 1155 of the deflector plate 1150 may be shaped and sized to define a cavity that acts to increase pressure at the compressor side of the journal bearing 1230. As an example, the recessed portion 1155 may be shaped and sized to increase turbulence within a cavity.

In the example of FIG. 12, the center housing 1280 includes a through bore in which a journal bearing 1230 is positioned to support a shaft 1220 where the journal bearing 1230 may be located via a locating pin 1210. As shown, a thrust collar 1270 may include various diameters, for example, a diameter that defines a portion of a cavity and other diameters to receive one or more O-rings to help form a seal with a bore of the backplate 1290.

Figure 13:
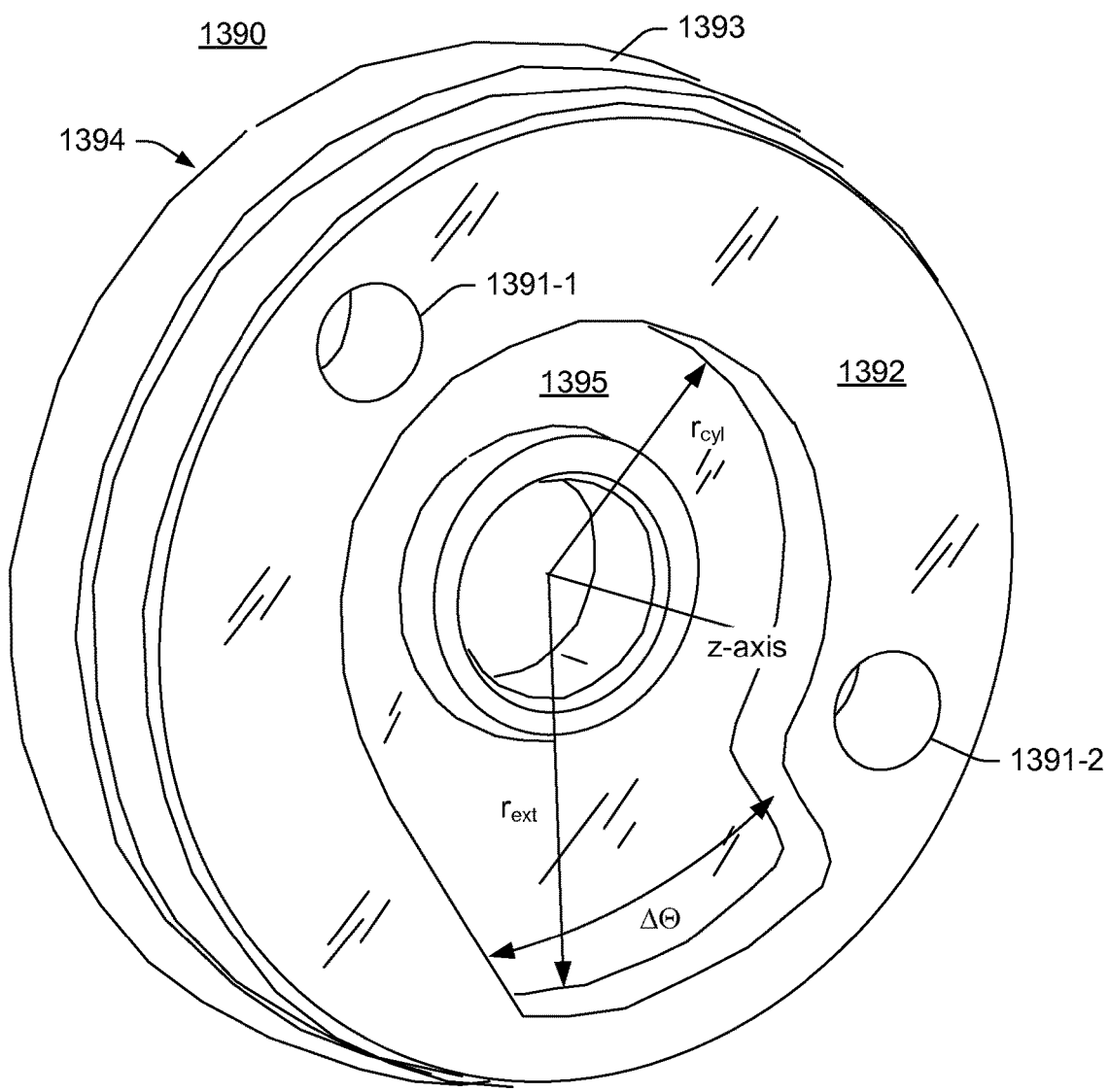
FIG. 13 is a perspective view of an example of a backplate.

FIG. 13 shows a perspective view of an example of a backplate 1390 that includes one or more mounting features 1391-1 and 1391-2, a journal bearing side surface 1392 that includes a recessed portion 1395 (e.g., a recess) that extends axially inwardly from the journal bearing side 1392 (e.g., from an axial face), a compressor side surface 1394 and a surface 1393 (e.g., cylindrical or other shape) disposed between the surfaces 1392 and 1394. As shown in the example of FIG. 13, the recessed portion 1395 has a cylindrical portion (see, e.g., a radius $r_{cyl}$) that joins an extension (see, e.g., a radius $r_{ext}$), which may match an extension of a lubricant drainage cavity of a center housing (see, e.g., the cavity 787 of FIG. 8). In the example of FIG. 13, the mounting features 1391-1 and 1391-2 may be openings disposed a distance from a z-axis that allow for attaching the backplate 1390 to a center housing (e.g., via bolts, studs, etc.).

Figure 14:
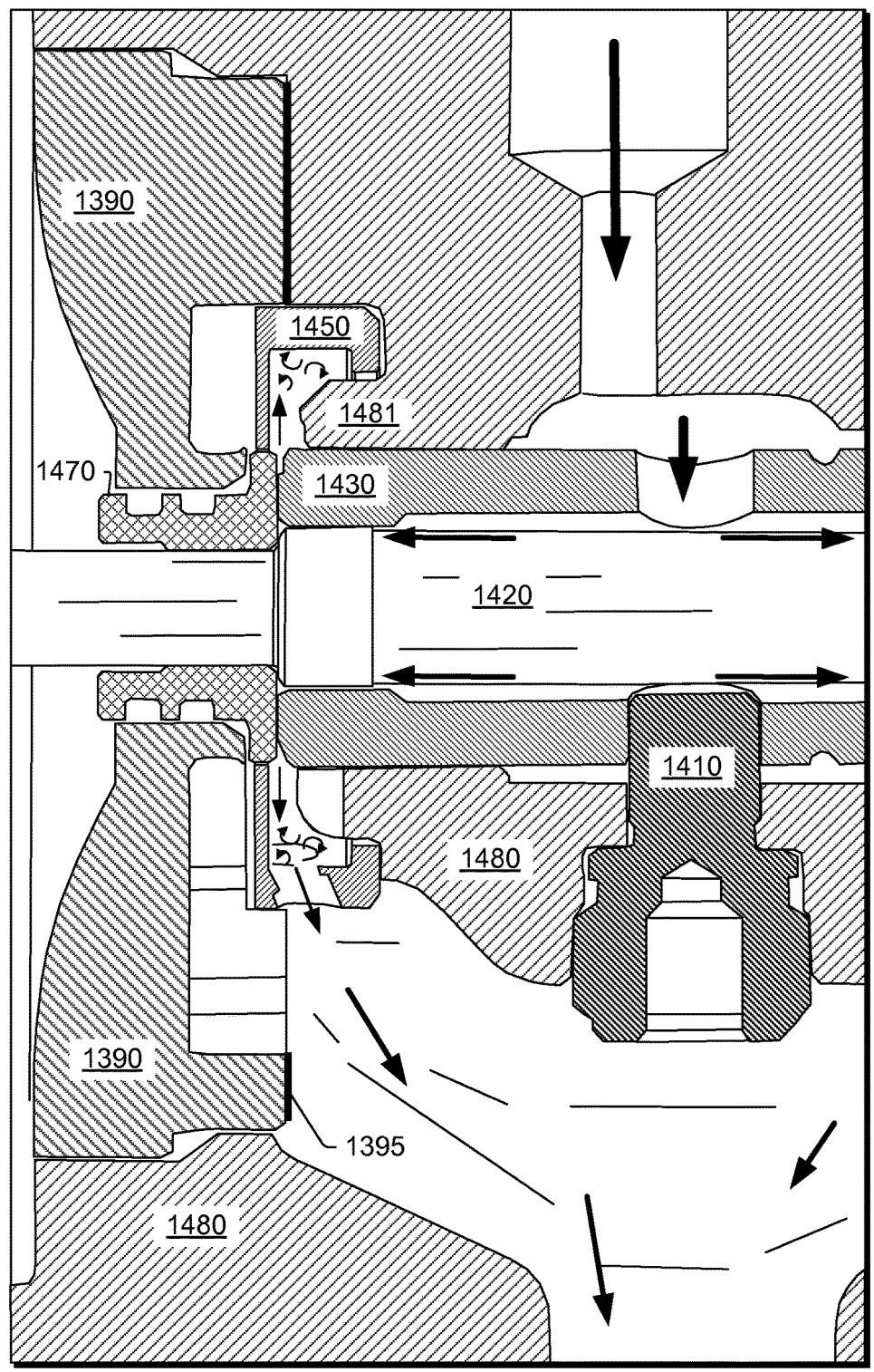
FIG. 14 is a cross-sectional view of an example of a turbocharger assembly that includes the backplate of FIG. 13.

FIG. 14 shows a cross-sectional view of an example of an assembly that includes the backplate 1390 as well as a deflector 1450 (see, e.g., the deflector 350 of FIG. 3 or other deflector described herein). In the example of FIG. 14, the backplate 1390 includes a coated region coated with, for example, a silicone sealant. In such a manner, use of an O-ring may optionally be avoided (e.g., about an outer surface that abuts a center housing). Further, such an approach can also seal about one or more through bolts or studs (e.g., to seal two through bolts or studs, each bolt or stud disposed in one of the openings 1391-1 and 1391-2 of the backplate 1390). As an example, the silicone sealant may be a pre-cured silicone applied to either the backplate 1390, a center housing 1480 or a combination of both. In FIG. 14, a thick black line indicates the sealant. While a portion of sealant is shown as being exposed to a lubricant drainage cavity of the center housing 1480, as an alternative, the sealant may be provided in regions where contact would occur between the backplate 1390 and the center housing 1480 (e.g., adjacent faces).

In the example of FIG. 14, the center housing 1480 includes a boss 1481 and a through bore where a journal bearing 1430 is positioned in the through bore. As shown, the journal bearing 1430 supports a shaft 1420 and may be located by a locating pin 1410. The assembly of FIG. 14 may include a thrust collar 1470, for example, with one or more annular grooves to seat one or more rings (e.g., piston rings, O-rings, etc.) to help form a seal between the thrust collar 1470 and a bore of the backplate 1390.

Figure 15:
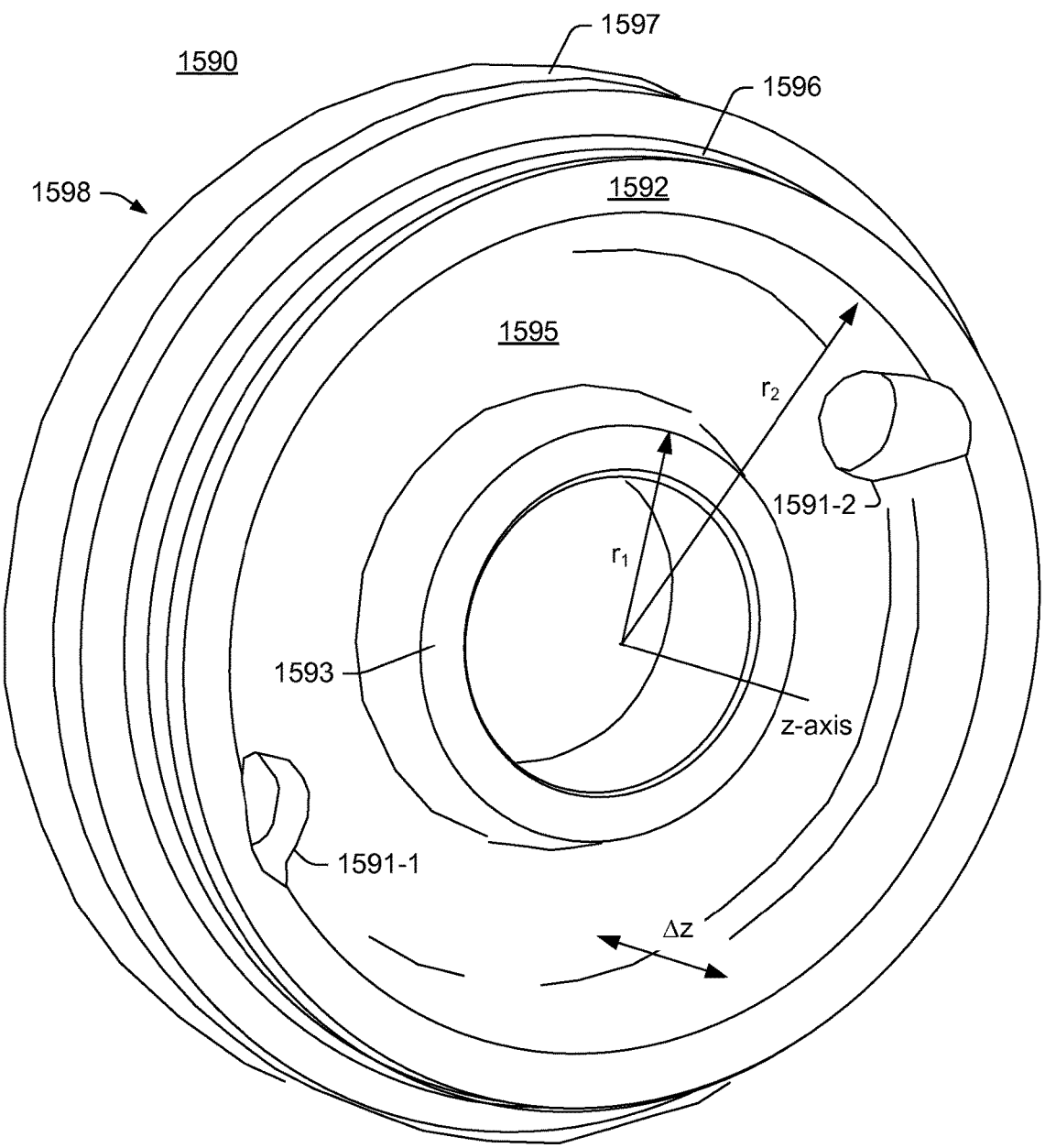
FIG. 15 is a perspective view of an example of a backplate.

FIG. 15 shows a perspective view of an example of a backplate 1590 that includes one or more mounting features 1591-1 and 1591-2, a journal bearing side surface 1592 that includes a recessed portion 1595 (e.g., a recess) as well as an inset annular face 1593, a compressor side surface 1598 and two surfaces 1596 and 1597 (e.g., of different dimensions) disposed between the surfaces 1592 and 1598. As an example, the recessed portion 1595 may be annular in shape and, for example, approximately defined by two radii (see, e.g., $r_1$ and $r_2$) and an axial depth (see, e.g., $\Delta z$). As an example, the backplate 1590 the compressor side surface 1598 may include a contour, for example, to accommodate a backside of a compressor wheel. As an example, the backplate 1590 may be attached to a center housing, for example, where a lubricant deflector is located between the journal bearing side surface 1592 of the backplate 1590 and a compressor side of the center housing.

Figure 16:
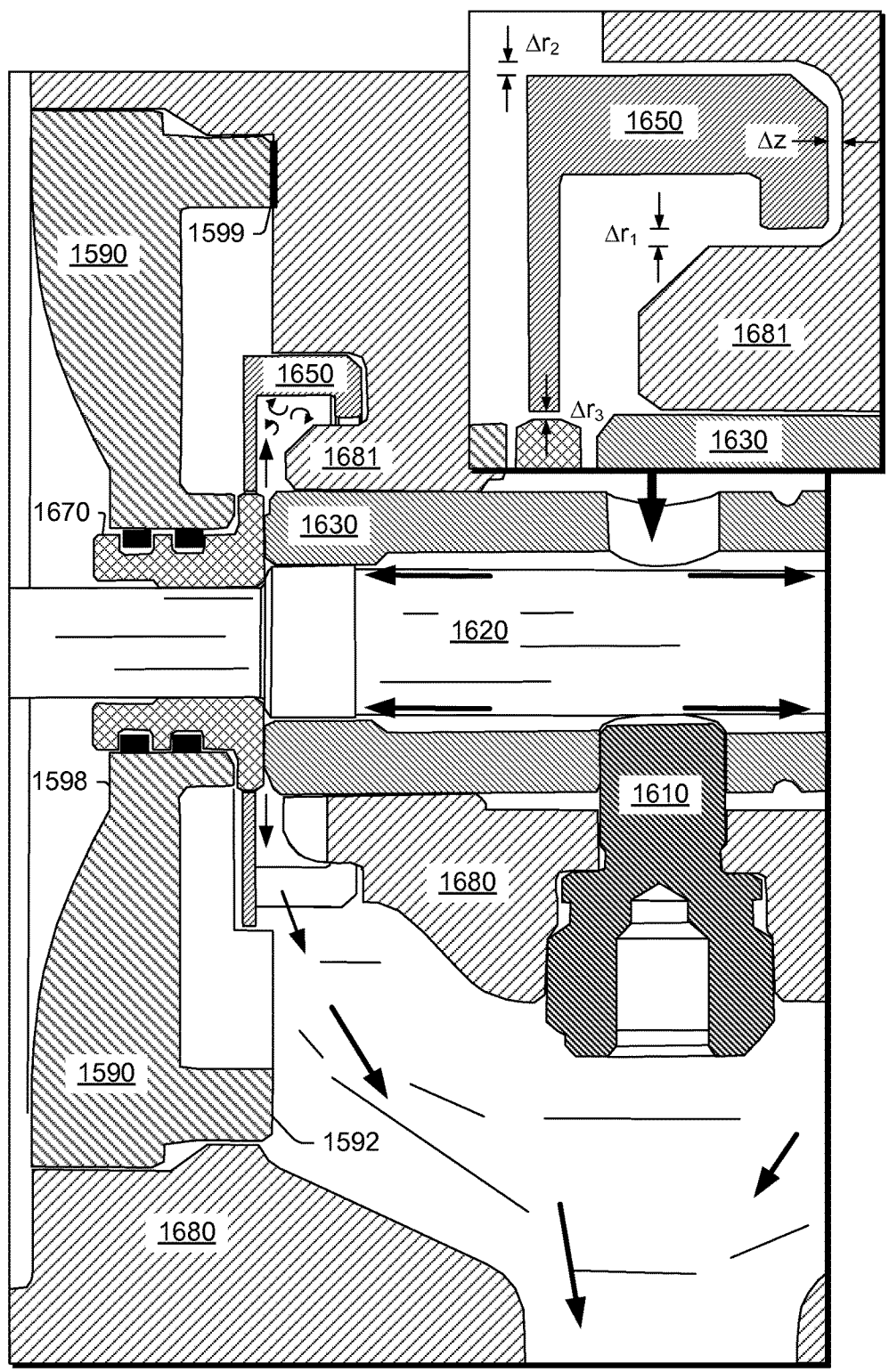
FIG. 16 is a cross-sectional view of an example of a turbocharger assembly that includes the backplate of FIG. 15.

FIG. 16 shows a cross-sectional view of an assembly that includes the backplate 1590 and a deflector 1650 (see, e.g., the deflector 650 of FIG. 6 or other deflector described herein). In the example of FIG. 16, a center housing 1680 includes a boss 1681 that defines, in part, a socket for receipt of the deflector 1650. As shown, a journal bearing 1630 may be positioned in a through bore of the center housing 1680 to support a shaft 1620. As an example, the journal bearing 1630 may be located via a locating pin 1610.

In an enlarged cross-sectional view, FIG. 16 shows various clearances between the deflector 1650, a thrust collar 1670, the center housing 1680 and the boss 1681 of the center housing 1680. For example, a radial clearance $\Delta r_1$ exists between the deflector 1650 and the boss 1681, a radial clearance $\Delta r_2$ exists between the deflector 1650 and the center housing 1680, a radial clearance $\Delta r_3$ exists between the deflector 1650 and the thrust collar 1670 and an axial clearance $\Delta z$ exists between the deflector 1650 and the center housing 1680. As an example, the deflector 1650 may float in the socket of the center housing 1680, for example, on lubricant that flows into deflector/socket clearances (e.g., as defined by the deflector 1650 and the center housing 1680).

As an example, the thrust collar 1670 may include one or more annular grooves configured to seat one or more rings. For example, the thrust collar 1670 may include two annular grooves to seat respective piston rings. In such an example, the piston rings may help to seal a bore of the backplate 1590 such that lubricant leakage from the journal bearing side surface 1592 of the backplate 1590 to the compressor side surface 1598 of the backplate 1590 is reduced. As an example, a silicone material or other material may be disposed between the journal bearing side surface 1592 of the backplate 1590 and a compressor side surface of the center housing 1680. For example, a material 1599 is shown as being disposed between at least a portion of the journal bearing side surface 1592 of the backplate 1590 and a surface of the center housing 1680. As an example, the backplate 1590 may be attached to the center housing 1680 using bolts, studs, etc. with sufficient force to clamp the material 1599 between the backplate 1590 and the center housing 1680 to thereby form a seal (e.g., to prevent or reduce lubricant leakage).

In the example of FIG. 16, the lubricant deflector 1650, as received in the socket of the center housing 1680, extends axially into a recess defined by the recessed portion 1595 of the backplate 1590, for example, such that an opening of the lubricant deflector 1650 is positioned radially outwardly from an outer diameter of the thrust collar 1670. In such an example, the inset annular face 1593 of the backplate 1590 may be positioned axially outwardly from the lubricant deflector 1650, for example, to axially locate the thrust collar 1670 (e.g., between the backplate 1590 and the journal bearing 1630).

As an example, a turbocharger assembly may include a lubricant deflector that does not contribute to axial stack-up. For example, a turbocharger assembly may include a lubricant deflector that is not strictly confined in an axial direction between two surfaces of the turbocharger assembly. In such an example, manufacturing tolerances of the lubricant deflector (e.g., in an axial direction) may not have an impact on an axial stack-up analysis for the turbocharger assembly.

As an example, a turbocharger assembly can include a center housing that includes a compressor side, a turbine side, a bore that extends between the compressor side and the turbine side and a socket at the compressor side; a journal bearing disposed in the bore; and a lubricant deflector disposed at least partially in the socket. In such an example, the lubricant deflector can define, in part, a cavity having a lubricant exit. Further, the center housing can include a lubricant drainage cavity having a lubricant drain and where the lubricant exit of the deflector includes an angle to direct lubricant exiting the exit toward the lubricant drain.

As an example, a center housing can include a boss at a compressor side where a surface of the boss defines, in part, a socket for a deflector.

As an example, a lubricant deflector may include a U-shaped cross-section, an L-shaped cross-section or a curved cross-section.

As an example, a socket of a center housing can include a keyway and a lubricant deflector can include a key for receipt by the keyway to orient the lubricant deflector with respect to the center housing. In such an example, the key can include an axial stop for axially locating a backplate.

As an example, a lubricant deflector can include a compressor side opening and a journal bearing side opening, for example, where the compressor side opening has a radius that exceeds an outer radius of a thrust collar or slinger and where the journal bearing side opening has a radius that exceeds an outer radius of the journal bearing.

As an example, a lubricant deflector and a center housing can form a cavity that has a substantially L-shaped cross-section (e.g., for at least a portion of the cavity). As an example, a lubricant deflector may be made of sheet metal.

As an example, a lubricant deflector can include an outer diameter and a socket of a center housing can include an inner diameter, for example, where the inner diameter of the socket exceeds the outer diameter of the lubricant deflector by an amount that defines a radial clearance. In such an example, the radial clearance may provide for formation of a lubricant film during operation of the turbocharger assembly and floating of the lubricant deflector on the lubricant film for radial movement of the lubricant deflector with respect to the socket of the center housing.

As an example, a lubricant deflector and a center housing can include a key and keyway pair to orient the lubricant deflector with respect to a socket of the center housing. In such an example, the lubricant deflector may float on a lubricant film during operation (e.g., in a radial direction) while being limited in its rotation with respect to the socket by the key and keyway pair.

As an example, a turbocharger assembly can include a backplate that includes a journal bearing side and a compressor side where the journal bearing side includes an annular recessed portion and where a lubricant deflector extends axially into the annular recessed portion.

As an example, a method can include providing a cavity between a deflector and a compressor side of a center housing of a turbocharger, the turbocharger having a shaft supported by journal bearing disposed in a bore of the center housing; directing pressurized lubricant to an inlet of the center housing; flowing the lubricant to the journal bearing for lubricating an annular clearance between the shaft and the journal bearing; capturing within the cavity lubricant exiting a compressor side of the annular clearance; and directing lubricant from the cavity towards a lubricant drain of a lubricant drainage cavity of the center housing.

In such a method, the directing lubricant from the cavity can include directing lubricant via one or more openings of the deflector. As an example, one or more openings of a deflector can act to increase a pressure drop between a cavity and a lubricant drainage cavity. In such a manner, direction of lubricant flow may be controlled (e.g., larger pressure driving force compared to an expansion approach assembly).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:
   a center housing that comprises a compressor side, a turbine side, a journal bearing bore that extends between the compressor side and the turbine side, a boss at the compressor side, and a socket at the compressor side that is defined in part by a surface of the boss and that is disposed about and axially inset from a compressor side opening of the journal bearing bore;
   a journal bearing disposed at least in part in the journal bearing bore; and
   a lubricant deflector disposed at least partially in the socket,
   wherein at least a portion of an axially extending wall of the lubricant deflector axially overlaps a portion of the journal bearing, wherein the portion of the journal bearing comprises a compressor end that extends axially past the compressor side opening of the journal bearing bore, and wherein the surface of the boss is at least in part radially inward of at least a portion of the axially extending wall of the lubricant deflector.

2. The turbocharger assembly of claim 1 wherein the lubricant deflector defines, in part, a cavity having a lubricant exit.

3. The turbocharger assembly of claim 2 wherein the center housing comprises a lubricant drainage cavity having a lubricant drain and wherein the lubricant exit comprises an angle to direct lubricant exiting the exit toward the lubricant drain.

4. The turbocharger assembly of claim 1 wherein the lubricant deflector comprises a U-shaped cross-section, an L-shaped cross-section or a curved cross-section.

5. The turbocharger assembly of claim 1 wherein the socket of the center housing comprises a keyway and wherein the lubricant deflector comprises a key for receipt by the keyway to orient the lubricant deflector with respect to the center housing.

6. The turbocharger assembly of claim 5 wherein the key comprises an axial stop for axially locating a backplate.

7. The turbocharger assembly of claim 1 wherein the lubricant deflector comprises a compressor side opening and a journal bearing side opening.

8. The turbocharger assembly of claim 7 wherein the compressor side opening comprises a radius that exceeds an outer radius of a thrust collar or slinger.

9. The turbocharger assembly of claim 7 wherein the journal bearing side opening comprises a radius that exceeds an outer radius of the journal bearing.

10. The turbocharger assembly of claim 1 wherein the lubricant deflector and the center housing form a cavity that comprises a substantially L-shaped cross-section.

11. The turbocharger assembly of claim 1 wherein the lubricant deflector comprises sheet metal.

12. The turbocharger assembly of claim 1 wherein the lubricant deflector comprises an outer diameter, wherein the socket of the center housing comprises an inner diameter and wherein the inner diameter of the socket exceeds the outer diameter of the lubricant deflector by an amount that defines a radial clearance.

13. The turbocharger assembly of claim 12 wherein the radial clearance provides for formation of a lubricant film during operation of the turbocharger assembly and floating of the lubricant deflector on the lubricant film for radial movement of the lubricant deflector with respect to the socket of the center housing.

14. The turbocharger assembly of claim 12 wherein the lubricant deflector and the center housing comprises a key and keyway pair to orient the lubricant deflector with respect to the socket of the center housing.

15. The turbocharger assembly of claim 14 wherein the key and keyway pair limit rotation of the lubricant deflector in the socket of the center housing.

16. The turbocharger assembly of claim 1 further comprising a backplate that comprises a journal bearing side and a compressor side wherein the journal bearing side comprises an annular recessed portion and wherein the lubricant deflector extends axially into the annular recessed portion.

17. A method comprising:
   providing a cavity between a deflector and a compressor side of a center housing of a turbocharger, the turbocharger having a shaft supported by journal bearing disposed at least in part in a journal bearing bore of the center housing wherein the deflector is disposed at least in part in a socket of the compressor side of the center housing wherein the socket is defined in part by a surface of a boss at the compressor side of the center housing and disposed about and axially inset from a compressor side opening of the journal bearing bore, wherein at least a portion of an axially extending wall of the deflector axially overlaps a portion of the journal bearing, wherein the portion of the journal bearing comprises a compressor end of the journal bearing that extends axially past the compressor side opening of the journal bearing bore, and wherein the surface of the boss is at least in part radially inward of at least a portion of the axially extending wall of the deflector;
   directing pressurized lubricant to an inlet of the center housing;
   flowing the lubricant to the journal bearing for lubricating an annular clearance between the shaft and the journal bearing;
   capturing within the cavity lubricant exiting a compressor side of the annular clearance wherein at least a portion of the axially extending wall deflects at least a portion of the lubricant; and
   directing lubricant from the cavity towards a lubricant drain of a lubricant drainage cavity of the center housing.

18. The method of claim 17 wherein the directing lubricant from the cavity comprises directing lubricant via one or more openings of the deflector.

19. The method of claim 18 wherein the one or more openings of the deflector act to increase a pressure drop between the cavity and the lubricant drainage cavity.

* * * * *